United States Patent
Codilian et al.

(10) Patent No.: US 7,035,026 B2
(45) Date of Patent: Apr. 25, 2006

(54) METHOD OF MANUFACTURING AND DISK DRIVE PRODUCED BY MEASURING THE READ AND WRITE WIDTHS AND VARYING THE TRACK PITCH IN THE SERVO-WRITER

(75) Inventors: Raffi Codilian, Irvine, CA (US); William D. Johns, Dana Point, CA (US); Charles A. Park, Aromas, CA (US); David D. Nguyen, Fountain Valley, CA (US); Jack M. Chue, Los Altos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 19 days.

(21) Appl. No.: 10/978,644

(22) Filed: Nov. 1, 2004

(65) Prior Publication Data

US 2005/0117240 A1    Jun. 2, 2005

Related U.S. Application Data

(63) Continuation of application No. 09/920,665, filed on Jul. 31, 2001, now Pat. No. 6,885,514.

(51) Int. Cl.
*G11B 27/36* (2006.01)
*G11B 21/02* (2006.01)

(52) U.S. Cl. .................... 360/31; 360/75; 29/603.09
(58) Field of Classification Search .................... None
See application file for complete search history.

(56) References Cited

U.S. PATENT DOCUMENTS

| | | | | |
|---|---|---|---|---|
| 6,091,559 A | * | 7/2000 | Emo et al. | 360/48 |
| 6,130,796 A | * | 10/2000 | Wiselogel | 360/75 |
| 6,172,839 B1 | * | 1/2001 | Ahn | 360/77.08 |
| 6,469,855 B1 | * | 10/2002 | Lamberts et al. | 360/60 |
| 6,538,838 B1 | * | 3/2003 | Sacks et al. | 360/77.01 |
| 2001/0040752 A1 | * | 11/2001 | Szita et al. | 360/77.04 |
| 2003/0133217 A1 | * | 7/2003 | Nunnelley | 360/75 |

* cited by examiner

*Primary Examiner*—Andrew L. Sniezek
(74) *Attorney, Agent, or Firm*—Blakely Sokoloff Taylor & Zafman

(57) ABSTRACT

A method of manufacturing a disk drive and a disk drive where the width of the read element and the width of the write element are both measured at servo-writing time and the track pitch of the disk drive is set on the basis of those measurements. Disk drives with superior head width combinations are servo-written with a narrower track pitch in order to have a higher storage capacity. Disk drives with inferior head width combinations are detected before servo-writing so that the disk drive may be servo-written with wider track pitch rather than with a nominal track pitch that results in a subsequent drive failure during initial burn-in (IBI). The heads are used more efficiently in that heads that are more capable are used to their ability and less capable heads that would otherwise be disposed of are used at all.

10 Claims, 10 Drawing Sheets

221: WRITE A TEST TRACK WITH THE HEAD'S WRITE ELEMENT 81 OF UNKNOWN WIDTH "W

222: MOVE RADIALLY AWAY AND READ THE TEST TRACK OF UNKNOWN WIDTH "W" WITH THE HEAD'S READ ELEMENT 82 OF UNKNOWN WIDTH "R" WHERE

223: REPEATEDLY MOVE BACK A LITTLE AT A TIME AND READ THE TEST TRACK TO DEVELOP A CONVOLUTION OF MAGNITUDE DATA THAT RAMPS UP, FLATTENS OUT AND RAMPS DOWN

|                | WIDE WRITER | NOMINAL WRITER | NARROW WRITER |
|----------------|-------------|----------------|---------------|
| WIDE READER   | LOW TPI     | LOW TPI        | LOW TPI       |
| NOMINAL READER| LOW TPI     | NOMINAL TPI    | HIGH TPI      |
| NARROW READER | LOW TPI     | HIGH TPI       | HIGH TPI      |

FIG. 9

METHOD OF MANUFACTURING AND DISK DRIVE PRODUCED BY MEASURING THE READ AND WRITE WIDTHS AND VARYING THE TRACK PITCH IN THE SERVO-WRITER

This application is a Continuation of patent application Ser. No. 09/920,665 filed Jul. 31, 2001, now U.S. Pat. No. 6,885,514.

BACKGROUND OF THE INVENTION

1. Field of the Invention

The present invention relates generally to magnetic disk drives (disk drives), and more particularly to an efficient method of manufacturing a disk drive by using a servo track writer (STW) for measuring the widths of the read and write elements to set the track pitch.

2. Description of the Related Art

Referring to FIG. 1, a conventional disk drive 10 has a head disk assembly (HDA) 20 including at least one disk 23, a spindle motor 22 for rapidly rotating the disk 23, and a head stack assembly (HSA) 40 that includes an actuator assembly 50 and a head gimbal assembly (HGA) (not numbered) with a transducer head 80 for reading and writing data. The HSA 40 is part of a servo control system that positions the transducer head 80 over a particular track on the disk to read or write information from that track. The HSA 40 earns its name from the fact that it generally includes a plurality of HGAs that collectively provide a vertical arrangement of heads called a "head stack."

The transducer heads 80 of several years ago were "merged" devices where reading and writing were accomplished with a single inductive element. The transducer head 80 commonly used today, however, is a magneto-resistive transducer head 80 that has separate read and write elements. FIG. 2 is a highly simplified representation of a magneto-resistive transducer head 80 having it's a write element 81 of width W and it's a read element 82 of width R. The transducer head 80 shown is a "write wide, read narrow" device in that the read element's width R is typically about 50–65% of the write element's width W.

FIG. 3 is an exploded perspective view of a fully-assembled HDA 20 having servo-writing access ports 25, 26 (discussed below) and the controller circuit board 30 that is usually installed after servo-writing. The controller circuit board 30 suitably positions the actuator assembly 50 and then reads or writes user data in accordance with commands from a host system (not shown).

Returning to FIG. 1, the industry presently prefers a "rotary" or "swing-type" actuator assembly 50 that conventionally comprises an actuator body 51 which rotates on a pivot assembly between limited positions, a coil 52 that extends from one side of the actuator body to interact with a pair of permanent magnets to form a voice coil motor (VCM), and an actuator arm 54 that extends from the opposite side of the actuator body to support the HGA.

A disk drive is ultimately used to store user data in one or more "data tracks" that are most commonly arranged as a plurality of concentric data tracks on the surface of its disk or disks. Special servo information is factory-recorded on at least one disk surface so that the disk drive's servo control system may control the actuator assembly 50, via the VCM, to accurately position the transducer head to read or write user data to or from the data tracks. In colloquial terms, the servo information provides the servo control system with the "your head is here" data it needs to attain and then maintain a desired head position. In operation, the disk drive's servo control system intermittently or continuously processes (read only) the pre-recorded servo information just before or while the disk drive processes (reads or writes) user data in the data tracks.

Earlier disk early drives used a "dedicated servo" system where one head and one disk surface provide the servo information for all of the other heads and disk surfaces. As shown in FIG. 4, however, the industry presently prefers an "embedded servo" system where the servo information is interspersed amongst the data on each surface of each disk. The factory-recorded servo information is contained in servo wedges 300 that are each divided into a plurality of servo sectors 310. The servo sectors 310 are recorded concentrically in order to provide numerous servo tracks (one entire rotation of servo sectors 310).

As shown, each servo wedge 300 generally comprises a header region (not separately identified) followed by a plurality of servo bursts. The header region fields include a setup or write splice field WRITE SPLICE, an address mark field AM, an automatic gain control/phase locked oscillator field AGC/PLO, a servo sync mark field SSM, a track identification field TKID, a wedge number field W#. The header region is followed by at least two servo bursts (an A burst and B burst are shown) that are circumferentially sequential and radially offset relative to a burst pair centerline. The servo format used is not critical and is explained here only for background purposes. The purpose of these various fields and available variations are well known to those of ordinary skill in the art.

The servo wedges 300 precede a corresponding number of data wedges 400 that are ultimately used to contain data tracks (not shown) that are divided into a plurality of data sectors (not shown) Each data wedge 400 may contain a whole or fractional part of one or more data sectors (not shown). Because the servo information is distributed around the disk within servo sectors 310, an embedded servo system is sometimes called a "sector servo" system.

The servo information is factory recorded at the time of manufacture using a relatively expensive and low-throughput manufacturing fixture called a servo track writer (STW). FIG. 5 is an exploded perspective view of a simplified servo-track writer (STW) 100 that is figuratively receiving an HDA 20 for servo-writing. The STW 100 records the servo information in special "servo tracks" on each surface of each disk for later use by the servo control system when the drive is in the hands of the user. The servo tracks are generally used throughout the life of the disk drive without modification.

In recording the embedded servo information, the STW 100 take temporary control of the drive's write operation via a suitable electrical connector 102, repeatedly locates the write element 81 to a desired radial position, and then writes, erases, or does nothing (remains idle) at specific angular positions between the head and a reference position of the disk as the disk rotates beneath the write head. In order to precisely locate the write element 81 where needed, as shown in FIG. 3, a conventional HDA 20 has first and second access ports 25, 26 (later covered with adhesive labels) for allowing the STW to "reach in" and temporarily control the radial position of the actuator assembly 50 and measure the angular position of the disk while recording the servo information. As to the radial position of the actuator assembly 50, the conventional STW inserts a moveable "push pin" 101 into the first port 25, commands the HDA's VCM to bias the actuator assembly 50 against the push pin, moves the push pin 101 against the bias to move the actuator assembly 50 and the attached head 80, and measures the position of the push pin 101 with a laser interferometer to control the radial position of the head's write element 81 carried by the pin-guided actuator assembly 50. As to the angular position of the write element 81 relative to an index position of the disk, the conventional STW inserts a stationary "clock head" (not shown) into the second port 26, records a "clock track" containing thousands of "clock marks" and one "index mark" (e.g. an extra clock mark or a gap) on a top-most or bottom-most disk surface, and measures the angular position of the write element 81 relative to the index mark by detecting the index mark and thereafter tracking (i.e. counting) the intermediate clock marks.

The conventional STW embeds a servo pattern onto a disk by recording concentric servo tracks in a plurality of discrete "passes." Each pass consists of moving the push-pin to "step" the transducer head to a desired radial position, allowing the head to "settle," and during one ensuing revolution of the disk, writing new servo information, erasing overlapping portions of previously written servo information, or remaining idle (neither writing nor erasing). On the first pass, the STW moves the write head to an outer diameter of the disk, and then records magnetic transitions at discrete angular intervals to record the servo information including track identification (track ID) data and servo bursts. During the second and each of the thousands of subsequent passes, the STW steps the write head inward by a fraction of the intended data track pitch (e.g. ½ and ⅓ data track increments), waits for the write head to settle (as much as one full revolution), and then records the servo information during another full revolution, writing more magnetic transitions, trimming overlapping portions of previously recorded transitions, or holding idle, as appropriate for the desired servo pattern. In order to record each concentric servo track, therefore, the STW must repeatedly step, wait, and record.

The servo-writing process is a manufacturing bottleneck because each HDA must remain in the STW for an extensive amount of time in order to step, wait, and record each pass that collectively make up the required servo information.

Magneto-resistive transducer heads 80 are very small devices that are manufactured in large batches using photolithographic wafer process techniques. As a result, operating characteristics such as the widths of the read and write elements 81, 82 tend to vary over a normal distribution curve for a given number of heads, wafers or manufacturers. The presence of separate read and write elements coupled with the wide variability of read width R and write width W is particularly troublesome as it relates to the servo-writing process and narrow range of widths that may presently be used.

In particular, the disk drive market is extremely competitive and drive makers are continually striving for manufacturing efficiencies, increased storage capacities, and higher performance in order to remain profitable. The servo-writing process is of major concern because STWs are so expensive (upward of $100,000) that only limited numbers can be used and it takes a long time to servowrite each disk drive (several minutes per drive). The servo-writing bottleneck is exacerbated by the fact that:

there is an ever increasing demand for areal density that can only be achieved with ever narrower data tracks (usually specified in tracks per inch or TPI) and ever tighter data densities (usually specified in bits per inch or BPI);

only a subset of the heads come from the manufacturer with read and write widths R, W that are suited for the nominal TPI. Some heads could be used with wider tracks, but they are not used at all. Some heads could be used with narrower tracks, but their enhanced capability is wasted with the nominal TPI, or worse, they are discarded altogether;

it is difficult to accurately identify this small subset of heads with currently available measurement techniques so, even if the heads are "binned" by making such measurements, many of the drives fail at a very late stage of the manufacturing process (after assembly of the HDA, servo-writing, mounting of the controller board and while testing the drive during Initial Burn-In or IBI), because one or more of the heads is too narrow or too wide. These failed drives must generally make a second trip through the servo-writing process, an unfortunate and expensive occurrence.

Achieving efficiencies in terms of head use and the overall servo-writing process, therefore, may significantly reduce the overall cost of manufacturing disk drives. Consequently, there remains a need for a method of manufacturing a disk drive that allows more of the heads to be used in the first instance and that reduces the number of drives that must be re-worked and then take a second trip through the entire servo-writing process.

SUMMARY OF INVENTION

In a first aspect, the invention may be regarded as a method of manufacturing a disk drive formed from a head disk assembly (HDA) containing at least one magnetic disk with a magnetic surface and a head stack assembly (HSA) that includes a transducer head with a write element for writing data to the magnetic disk and a read element for reading data from the magnetic disk, the method comprising the steps of: mounting the HDA in a servo track writer and moving the HSA to desired positions over the magnetic disk; measuring a width of the read element with the servo track writer; measuring a width of the write element with the servo track writer; determining a track pitch based on the measured width of the read element and the measured width of the write element; and writing servo tracks onto the magnetic disk at the determined track pitch.

In a second aspect, the invention may be regarded as a disk drive comprising a head disk assembly (HDA) containing at least one magnetic disk that includes a magnetic surface and a head stack assembly (HSA) that includes a transducer head with a write element for writing data to the magnetic disk and a read element for reading data from the magnetic disk, the disk drive produced using the steps of: measuring a width of the read element while the HDA is in a servo track writer; measuring a width of the write element while the HDA is in a servo track writer; determining a track pitch based on the measured width of the read element and the measured width of the write element; and writing servo tracks onto the magnetic disk at the determined track pitch.

BRIEF DESCRIPTION OF THE DRAWINGS

The just summarized invention may best be understood with reference to the Figures of which:

FIG. 9 illustrates a presently preferred decision table for determining track pitch based on read and write head widths.

DETAILED DESCRIPTION OF THE PREFERRED EMBODIMENT

This patent application is directed to a new, innovative method of manufacturing a disk drive and to a disk drive made in accordance with the method.

Figure 1:
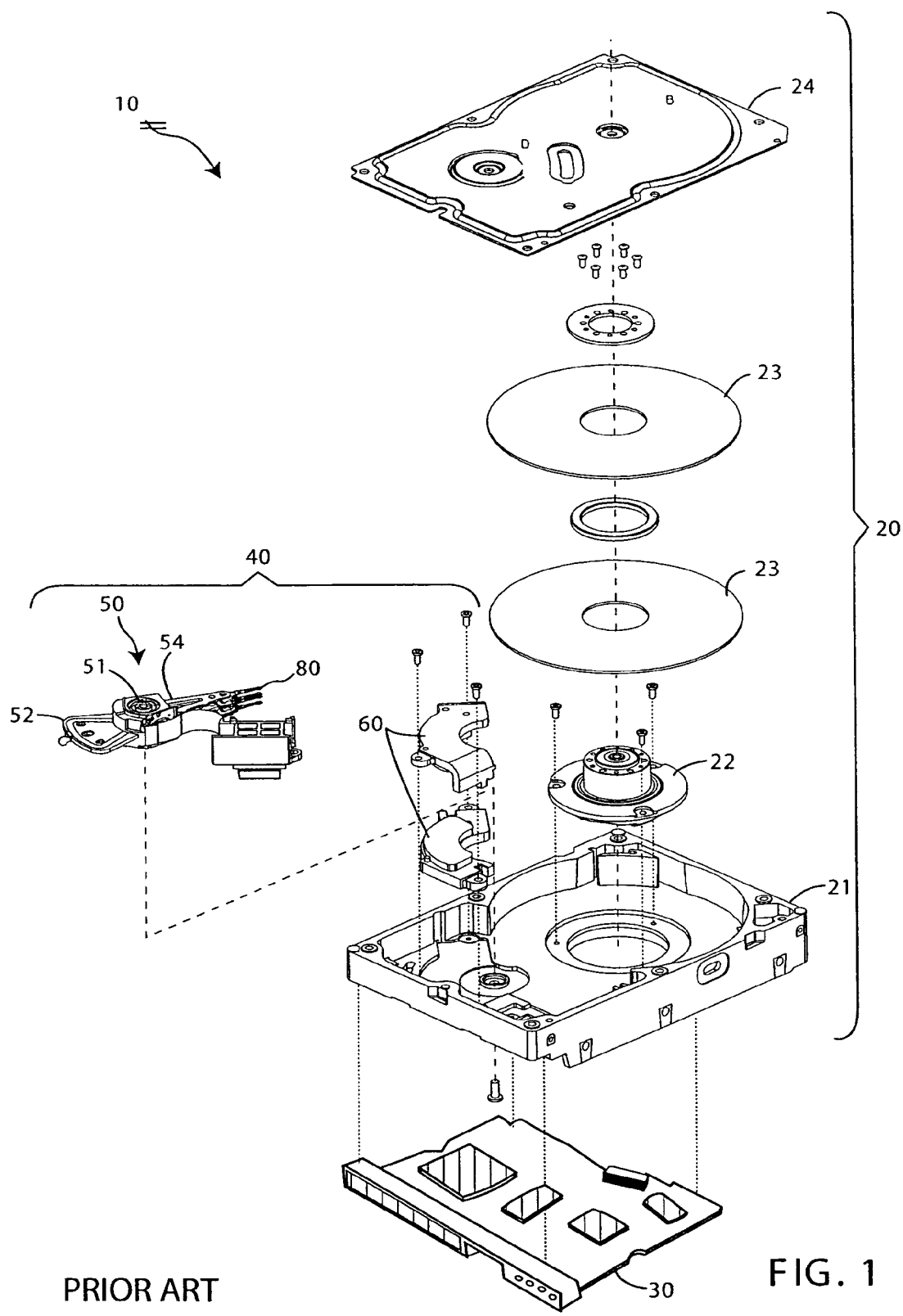
FIG. 1 is an exploded perspective view of a magnetic disk drive 10 having a head disk assembly 20 ("HDA") including a head stack assembly 40 ("HSA") which carries a transducer 80 over concentric data tracks and associated servo bursts on the surface of a disk 23.
Figure 2:
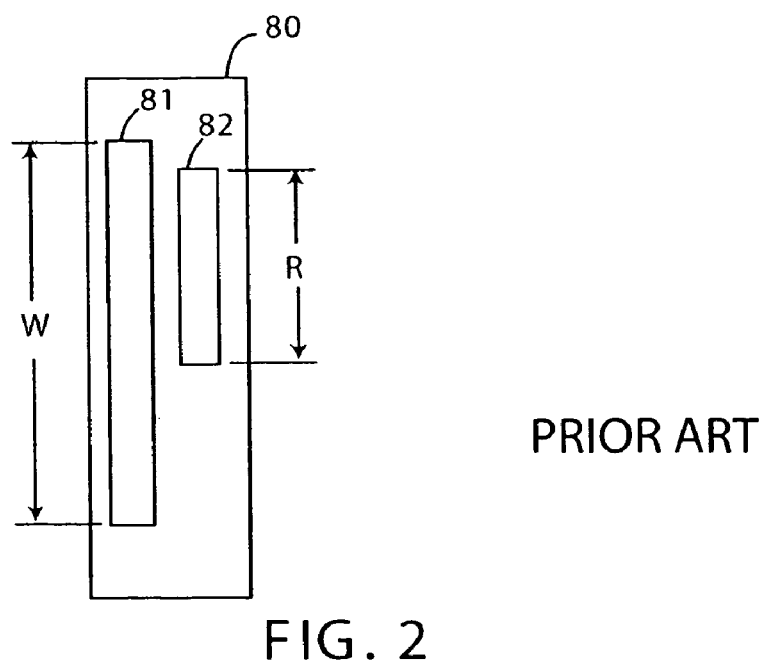
FIG. 2 is a simplified representation of a magneto-resistive transducer head 80 that has two elements that vary in width over a normal distribution curve, namely a write element 81 and a read element 82.
Figure 3:
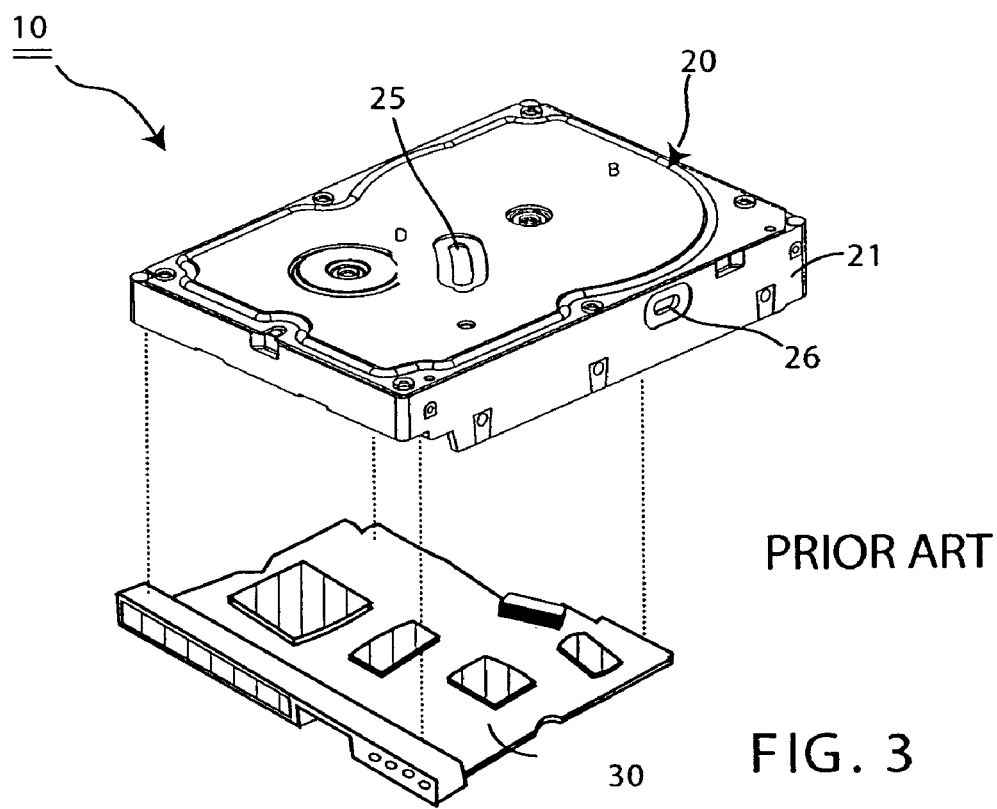
FIG. 3 is an exploded perspective view of a fully-assembled HDA 20 having servo-writing ports 25, 26 and the controller circuit board 30 that is usually installed after servo-writing.
Figure 4:
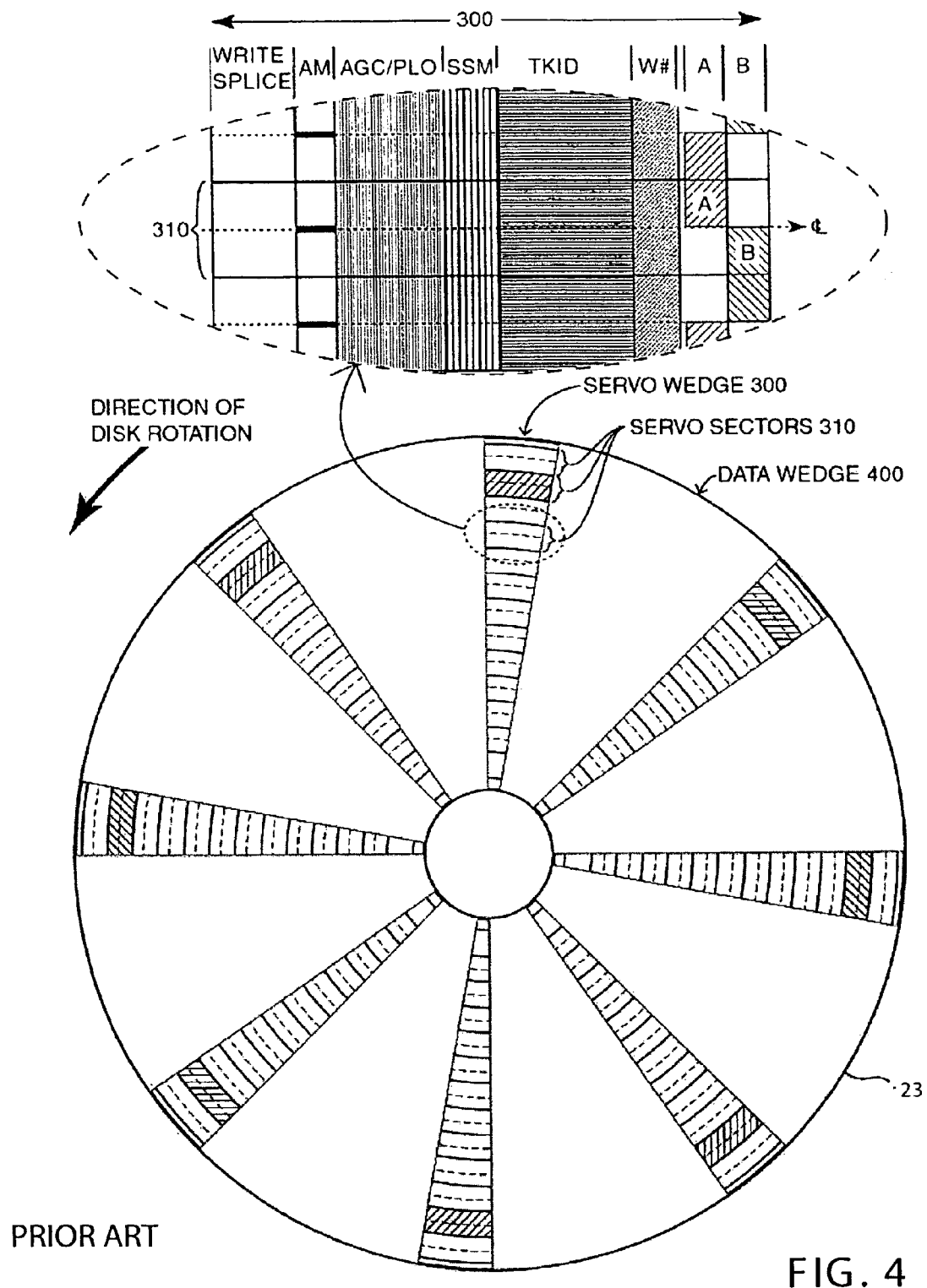
FIG. 4 is a top plan view of a disk containing embedded servo information that is recorded within concentric servo tracks that are each defined by a corresponding plurality of concentric servo sectors
Figure 6:
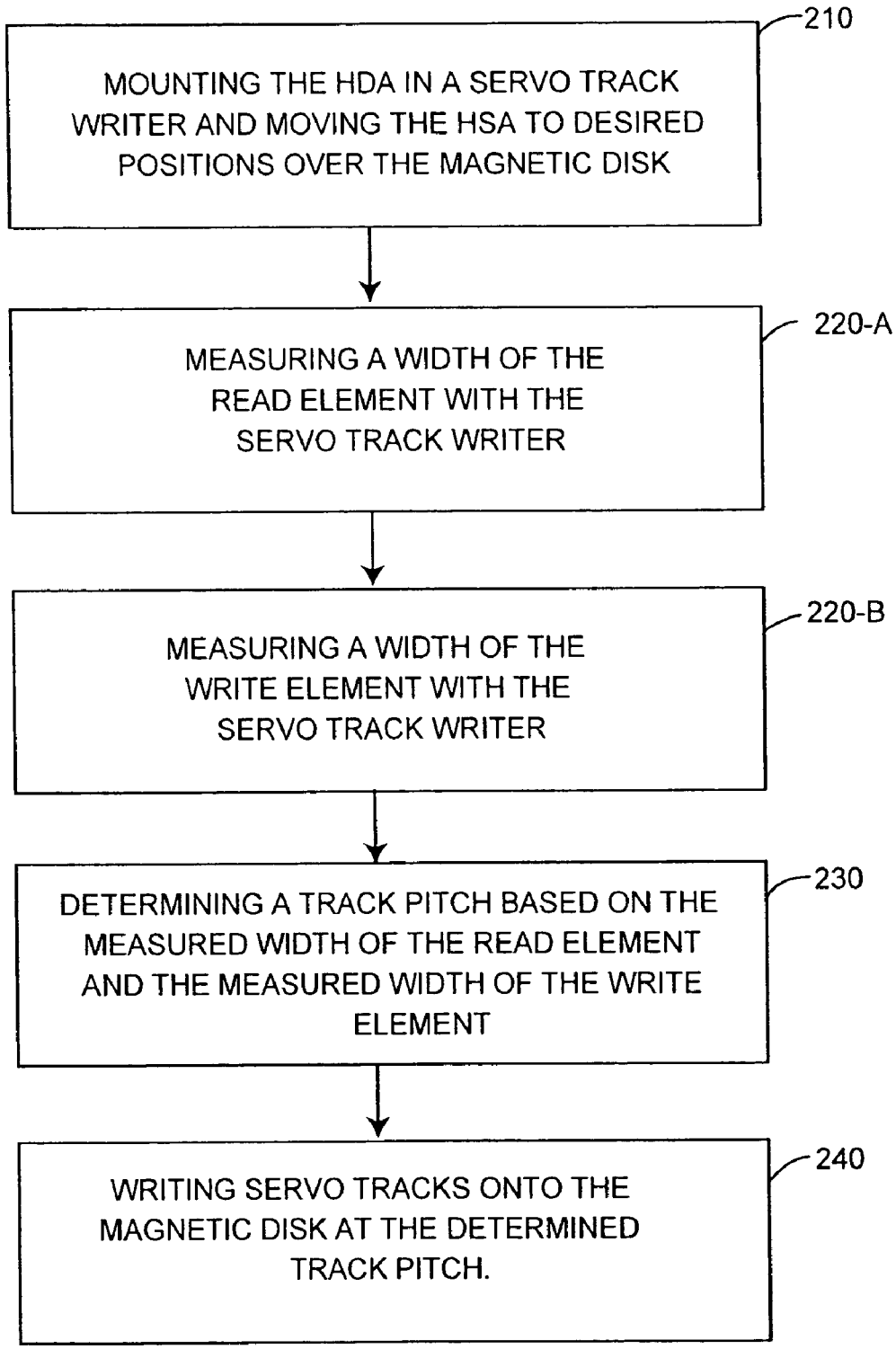
FIG. 6 is a flow-chart of a method of manufacturing according to this invention.

FIG. 6 is a flowchart of a preferred method of manufacturing a disk drive according to this invention. The illustrated method operates on an HDA 20 like that shown in FIGS. 1 and 3, i.e. an HDA 20 containing at least one magnetic disk 23 with a magnetic surface and a head stack assembly 40 that includes a two-element transducer head 80. The HDA 20 is usually placed into the STW 100 in "bare" form (i.e. without the controller circuit board 30), but as discussed below, it may be desirable to marry the HDA 20 with the controller circuit board 30 before mounting the disk drive 10 in the STW 100 and recording servo tracks.

Figure 5:
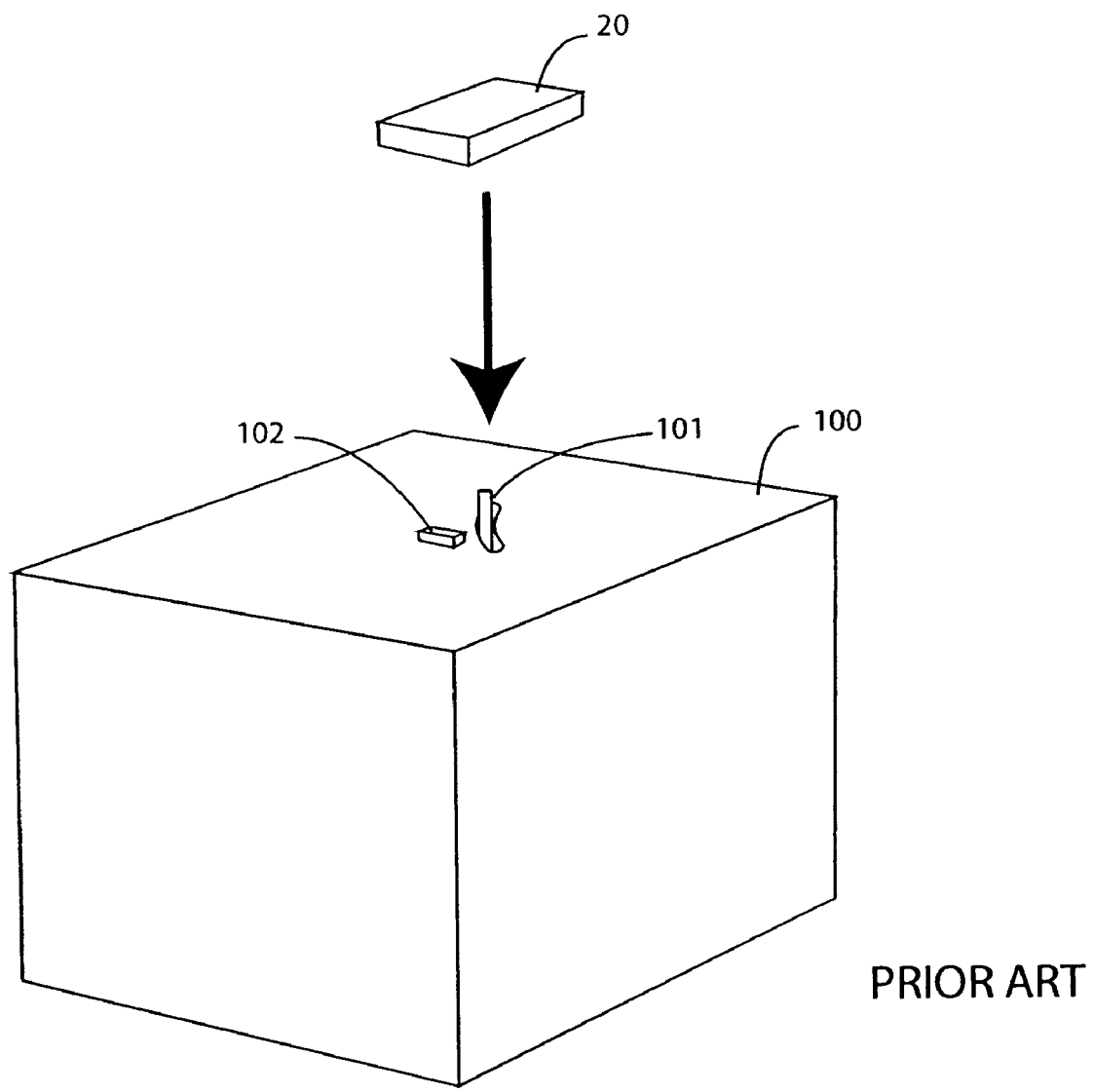
FIG. 5 is an exploded perspective view of a servo-track writer (STW) 100 receiving an HDA 20 for servo-writing.

The method begins at step 210 by mounting the HDA 20 in the STW 100 for moving the HSA 40 to desired positions over the magnetic disk. FIG. 5 further illustrates this step.

At steps 220-A and 220-B, the method proceeds by measuring a width "R" of the read element 82 with the STW 100 and by measuring a width "W" of the write element 81 with the STW 100. The required measurement steps 220-A and 220-B can be accomplished together or separately and in succession depending on the approach taken. In addition, the measurement steps 220-A and 220-B may be accomplished with a "smart" STW 100 that includes sufficient data processing capabilities to process a bare HDA 20 or by using a more conventional STW to process a fully-assembled disk drive 10 (HDA 20 and controller board 30), the STW operating in cooperation with suitable firmware on the controller circuit board 30.

The presently preferred approach is using an STW 100 that processes a bare HDA 20. A preferred STW 100 is manufactured by Xyratex. However, other STW's may be used.

At step 230, the method proceeds by determining a track pitch based on the measured width "R" of the read element 82 and the measured width "W" of the write element 81.

At step 240, the method proceeds with the STW 100 writing servo tracks onto the magnetic disk at the determined track pitch.

Measuring Methods

Any suitable measuring algorithm may be used, but FIGS. 7A to 7D graphically illustrate a first preferred method of measuring a width of the read and write elements 81, 82 in the method steps 220-A and 220-B of FIG. 6.

Figure 7A:
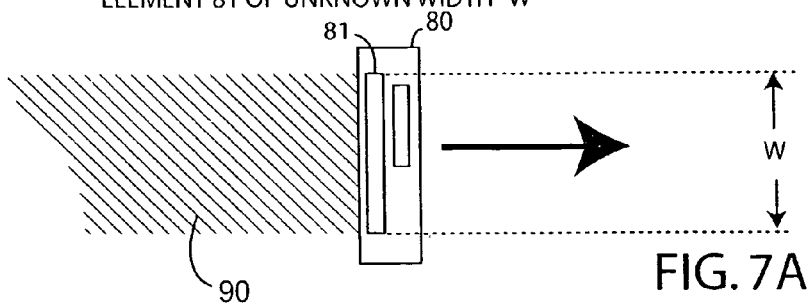
FIGS. 7A, 7B, 7C and 7D illustrate a preferred method of measuring a width of the read and write elements in the method of FIG. 6.

In FIG. 7A, corresponding to step 221, the STW 100 moves the transducer head 80 to a known location and then causes the head's write element 81 to record a test track 90 of unknown width "W".

Figure 7B:
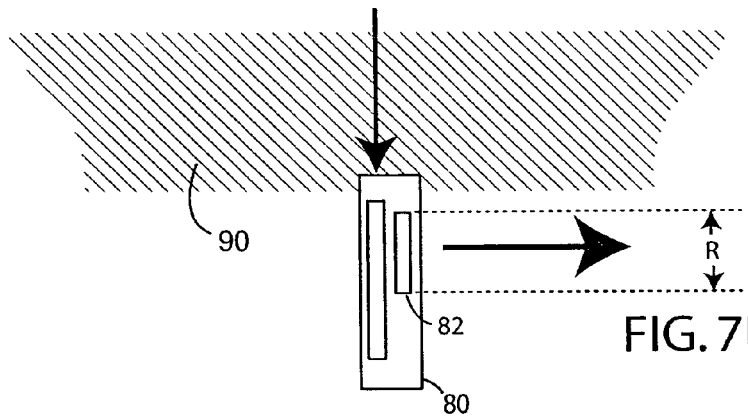

In FIG. 7B or step 222, as suggested by the vertical arrow, the STW 100 moves the transducer head 80 radially away from the known position at which the test track 90 was recorded to another second known position and, as suggested by the horizontal arrow, begins to try to read the test track 90 with the read element 82 of unknown width "R". The radial displacement between the first and second known positions should be sufficient to ensure that the read element 82 does not initially overlap the test track 90.

Figure 7C:
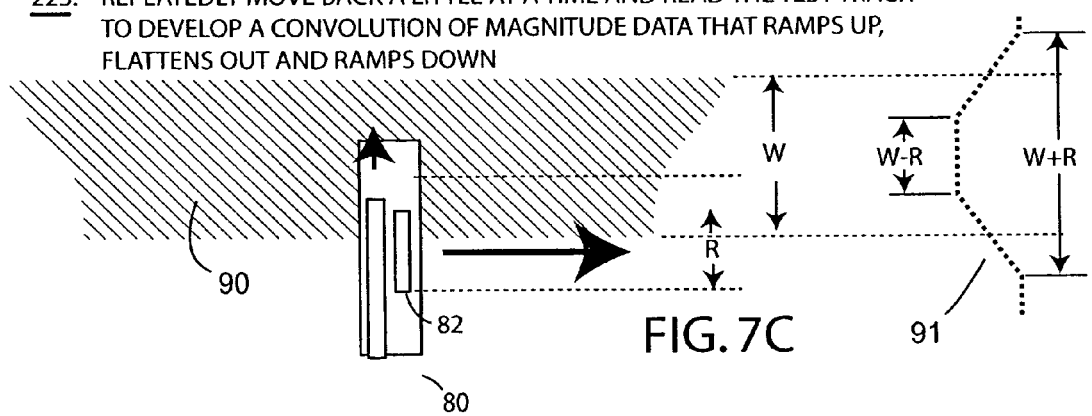

In FIG. 7C or step 223, as suggested by the upwardly pointing arrow, the STW 100 repeatedly moves the head 80 back toward the first known position a little at a time and, after each such movement, tries to read the test track 90. The result of many such passes after moving the head 80 sufficiently beyond the first known position is the development of convolution data 91 that ramps up, flattens out, and then ramps down. Each data point in the convolution data 91, of course, is associated with a position count (e.g. 10,000) that is available to the STW.

Figure 7D:
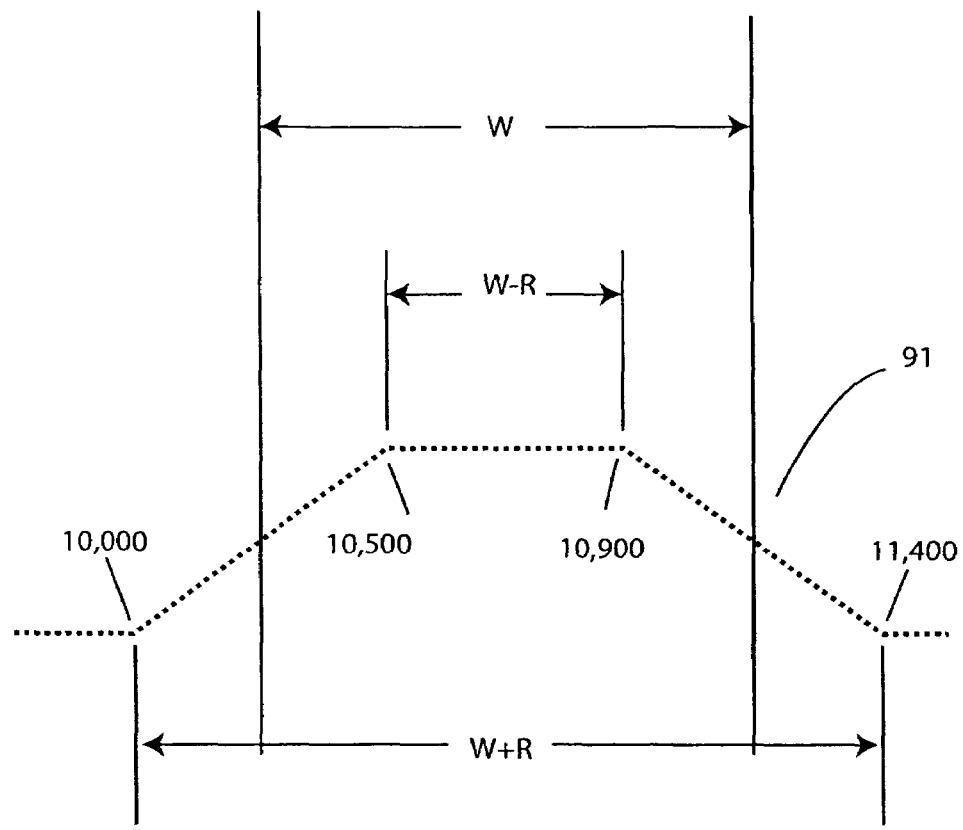
Figure 8A:
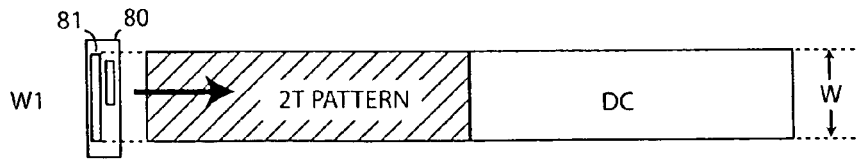
FIGS. 8A, 8B, 8C and 8D illustrate an alternative method of measuring a width of the read and write elements.
Figure 8B:
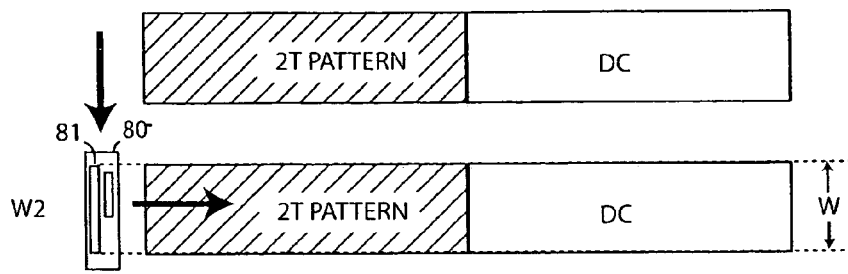
Figure 8C:
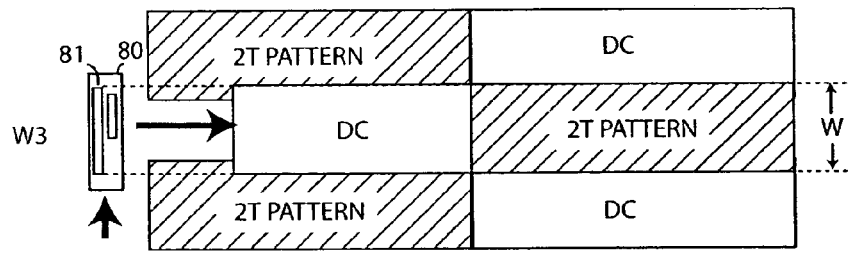
Figure 8D:
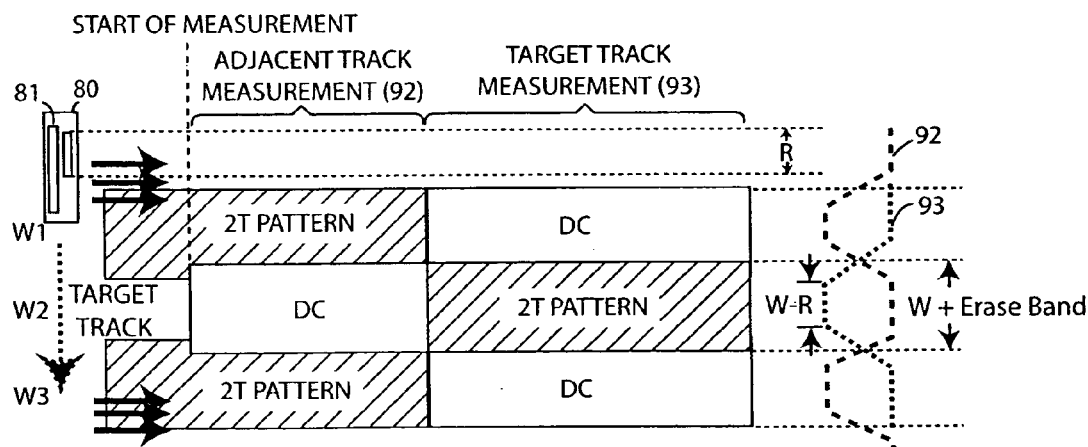

In FIG. 7D or step 224, as suggested by a more detailed view of the convolution data 91 In conjunction with some hypothetical position counts associated with each point of inflection, the STW 100 computes the read element's width "R" and the write elements width "W" from the mathematical relationships between W−R, W+R and the four position counts. In the example shown, "W"=900 and "R"=500. By way of example, if each count represents 0.02 micro-inches, this translates to a write element 81 with a width of 18 micro-inches and a read element 82 having a width of 10 micro-inches.

FIGS. 8A to 8D illustrate an alternative measuring method that involves three written tracks W1, W2 and W3. The length of the first and subsequent written tracks W1, W2 and W3 is preferably short, in the neighborhood of 500 bytes, so that external perturbations do not affect the accuracy of the measurement. It is preferable, in other words, to make the measurements over a short distance rather than over full revolutions.

This alternative approach may be desirable in that it inherently includes an erase band effect (typically on the order of 2%) in connection with the determining the width of the write element 81.

At step 8A, the STW 100 causes the write element 81 to record a first written track W1 at a known position on the disk. The written track W1 includes an initial data area (hatched) followed by a DC erase area. The data area may be written with any suitable patter such as the 2T pattern common recorded in a PLL/AGC field.

At step 8B, the STW 100 steps the head 80 radially away from W1 and then causes the write element 81 to record a second written track W2 using the same pattern of an initial data area (hatched) followed by a DC erase area. The step distance must be such that the distance between the two written tracks W1 and W2 is less than the minimum width expected for a write element 81.

At step 8C, the STW 100 steps the head 80 radially back from W2 and then causes the write element 82 to record a third written track W3. In this case, however, the write element 81 is controlled so at to record a DC erase area followed by a data area (hatched). At this point, the data area of the first and second written tracks W1, W2 have been erased back by the DC erase portion of W3 while the data area of written track W3 is full width. The beginning of the third written track W3 may be delayed somewhat, as shown, so that a clean unmodified portion of either written track W1 or W2 is available for gain normalization that establishes a fixed gain to be used during the gathering of data. In the context of an STW 100, however, it may be sufficient to use the same fixed gain for all drives and thereby eliminate the need to perform gain normalization on a drive-by-drive basis.

At step 8D, the STW 100 incrementally steps the head in small radial amounts while measuring the power of the signal detected by the read element 82 in the two successive regions labeled "Adjacent Track Measurement" and "Target Track Measurement" for each pass (or on two successive passes as the same position) corresponding to two collection of data 92, 93. Thus, the STW 100 incrementally gathers a large number of samples 92, 93 that, if all were gathered, would appear as shown to the right of FIG. 8D.

The cross-over points between the two sets of data 92, 93 correspond to the boundaries between the first two written track W1, W2 and the third written track W3, any erase band effect recorded by the write element 81 and detected by the read element 82. The STW 100, of course, does not need to gather all of the data and then mathematically process it as the STW 100 can simply hunt for the two positions where the data values 92, 93 are equal and perform a simple subtraction to determined the value "W+Erase".

The width "R" of the read element 82 may be determined from the width of the saturated flat spot of data curve 93 which is equal to W–R. As the erase bands will impose some degree of error on this measurement, a realistic approach to determining the width "R" is to simply establish the point of the two boundaries as the position at which the signal is 90% of the maximum power value.

There are other possible ways to measure the width "R" of the write element. One alternative approach, for example, involves writing a track, moving the head by a small amount (say 5% of a track pitch), and DC erasing the written track to leave a sliver that is narrower than the write elements width "R". The read head 82 may then be repeatedly passed over the sliver, with small amounts of radial movement between passes, in order to develop a convolution of data that is representative of the read element's width "R".

Determining Track Pitch

A variety of approaches may be taken in terms of implementing the details of step 230, i.e. in determining a track pitch based on the measured width "W" of the write element 81 and the measured width "R" of the read element 82.

FIG. 9 illustrates a presently preferred decision table for determining track pitch based on read and write head widths. If the widest write head width is beyond a "wide" threshold, then the TPI is set to "low" regardless of the read head width. If the widest write head width is within a "nominal" range, then the TPI is set to "low", "nominal" or "high" as a function of the widest read head width. If the widest write head width is below a "narrow" threshold, then the TPI is set to "high" unless the widest read head width is beyond a "wide" threshold in which case the TPI is set to "low".

Figure 10:
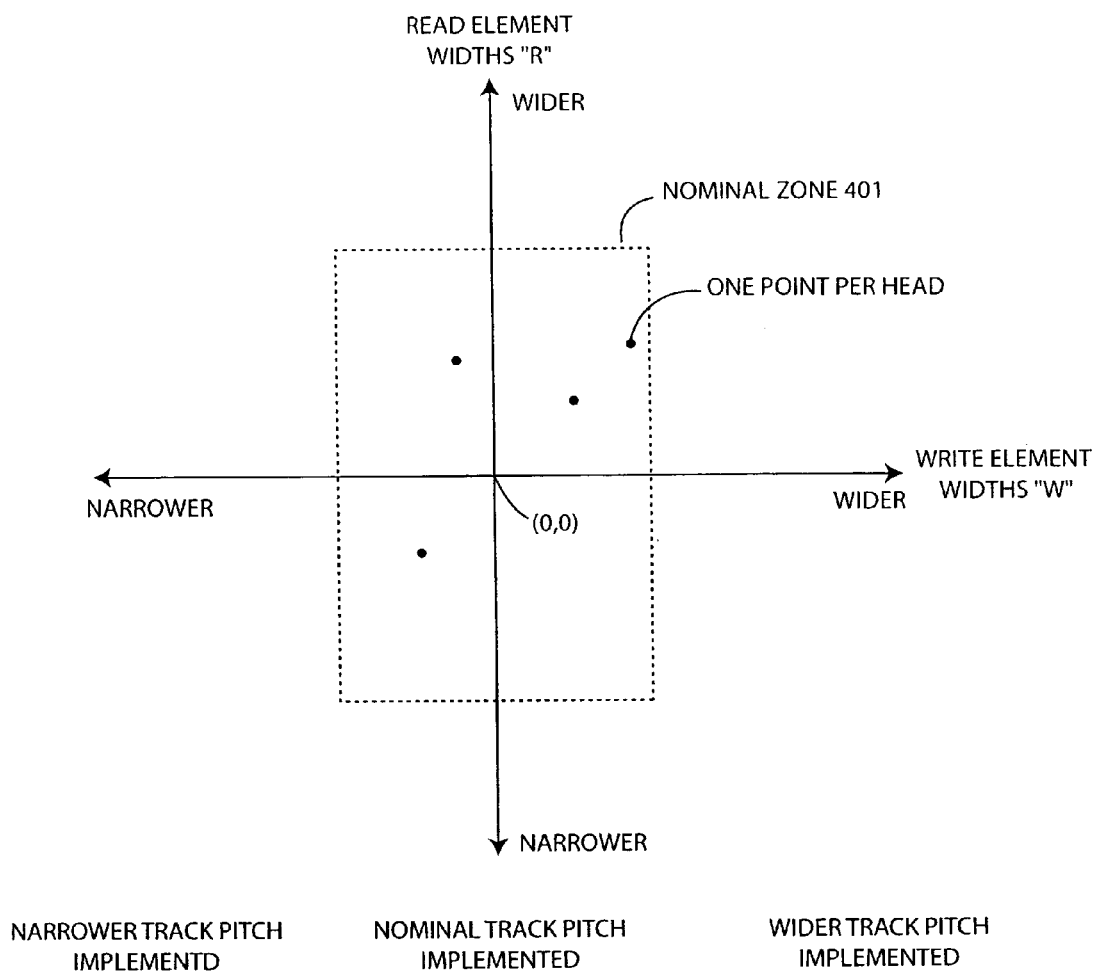
FIG. 10 illustrates an alternative approach to determining the track pitch.

FIG. 10, however, illustrates an alternative approach where the HDA 20 includes a plurality of transducer heads 80, where the measuring steps are performed for each transducer head 80 to establish a collection of width measurements; and where the determining step is accomplished based on the collection of width measurements.

As suggested by FIG. 10, the collection of width measurements may be algorithmically analyzed in a two-dimensional selection system where the "x"-axis corresponds to write element widths "W" and the "y"-axis corresponds to read element widths "Y". The origin or (0,0) point corresponds to the pair of widths (W, R) that are designated as nominal. For example, it may be that a particular vendor is requested to deliver heads 80 that nominally have a write width "W" of 20 micro-inches and a read width "R" of 15 micro-inches.

In operation, based on the write element width "W" and the read element width "R" that are measured for each head 80 in steps 220-A and 220-B, a data point is developed and algorithmically mapped into the coordinate system of FIG. 10. If all of the data points are inside of the nominal zone 401, then the STW 100 servo-writes the HDA 20 with a nominal track pitch and corresponding TPI. If one or more of the head's data points is wider than usual and located to the right of the nominal zone 401, then the STW 100 servo-writes the HDA 20 with a wider than nominal track pitch. If one or more of the head's data points is narrower than usual and located to the left of the nominal zone 401, then the STW 100 servo-writes the HDA 20 with a narrower than nominal track pitch.

We claim:

1. A method of manufacturing a disk drive formed from a head disk assembly (HDA) containing at least one magnetic disk with a magnetic surface and a head stack assembly (HSA) that includes a transducer head with a write element for writing data to the magnetic disk and a read element for reading data from the magnetic disk, the method comprising the steps of:

mounting the HDA in a servo track writer and moving the HSA to desired positions over the magnetic disk;

measuring a width of the read element with the servo track writer;

measuring a width of the write element with the servo track writer;

selecting a pre-defined track pitch from a plurality of selectable track pitch intervals based on the measured width of the read element and the measured width of the write element; and writing servo tracks onto the magnetic disk at the determined track pitch.

2. The method of claim 1 wherein the HDA carries a controller card having a microprocessor that is placed in communication with the STW when the HDA is mounted in the STW and wherein the microprocessor participates in the steps of measuring the widths of the read and write elements.

3. The method of claim 1 wherein the HDA is a bare HDA and wherein the STW includes independent processing capability for performing the steps of measuring the widths of the read and write elements.

4. The method of claim 1 wherein the HDA contains a plurality of magnetic surfaces and corresponding transducer heads, wherein the measuring steps are performed for each transducer head to establish a collection of width measurements; and wherein the determining steps is accomplished based on the collection of width measurements.

5. The method of claim 1 wherein the steps of measuring the width of the read element and the width of the write element are accomplished by:

writing a calibration track with the write element;

positioning the read element to a first side of the calibration track;

gathering amplitude data by incrementally moving the read element from the first side of the calibration track to a second opposite side while reading data at each incremental position; and calculating the width of the read element and the width of the write element based on the amplitude data.

6. The method of claim 1 wherein the step of determining a track pitch based on the measured width of the read element and the measured width of the write element is accomplished by:

establishing a nominal pair of width values;

using a nominal track pitch when the measured widths are within corresponding +/− limits of the nominal pair of width values;

using a narrower than nominal track pitch when the measured width of the write elements is narrower than the − limit of the nominal width value of the write element; and using a wider than nominal track pitch when the measured width of the write element is wider than the + limit of the nominal width value of the write element.

7. A disk drive comprising a head disk assembly (HDA) containing at least one magnetic disk that includes a magnetic surface and a head stack assembly (HSA) that includes a transducer head with a write element for writing data to the magnetic disk and a read element for reading data from the magnetic disk, the disk drive produced using the steps of:

measuring a width of the read element while the HDA is in a servo track writer;

measuring a width of the write element while the HDA is in a servo track writer;

selecting a pre-defined track pitch from a plurality of selectable track pitch intervals based on the measured width of the read element and the measured width of the write element; and writing servo tracks onto the magnetic disk at the determined track pitch.

8. The disk drive of claim 7 where the transducer head with a write element for writing data to the magnetic disk and a read element for reading data from the magnetic disk is a magneto-resistive transducer head.

9. The disk drive of claim 7 wherein the HDA contains a plurality of magnetic surfaces and corresponding transducer heads, wherein the measuring steps are performed for each transducer head to establish a collection of width measurements; and wherein the determining steps is accomplished based on the collection of width measurements.

10. The disk drive of claim 7 wherein the steps of measuring the width of the read element and the width of the write element are accomplished by:

writing a calibration track with the write element;

positioning the read element to a first side of the calibration track;

gathering amplitude data by incrementally moving the read element from the first side of the calibration track to a second opposite side while reading data at each incremental position; and calculating the width of the read element and the width of the write element based on the amplitude data.

\* \* \* \* \*